F. B. GUTHRIE.
Improvement in Butchers' Spreaders.

No. 131,096. Patented Sep. 3, 1872.

Witnesses:
Thos. J. West
Jonathan Thompson

Inventor:
Fountain B. Guthrie

UNITED STATES PATENT OFFICE.

FOUNTAIN B. GUTHRIE, OF CRAWFORDSVILLE, INDIANA.

IMPROVEMENT IN BUTCHERS' SPREADERS.

Specification forming part of Letters Patent No. 131,096, dated September 3, 1872.

SPECIFICATION.

*To all whom it may concern:*

Be it known that I, FOUNTAIN B. GUTHRIE, of Crawfordsville, in the county of Montgomery and State of Indiana, have invented a new and useful "Butchers' Spreader;" and I do hereby declare that the following is a full and correct description thereof, reference being had to the accompanying drawing making a part of this specification, in which—

Figure 1:
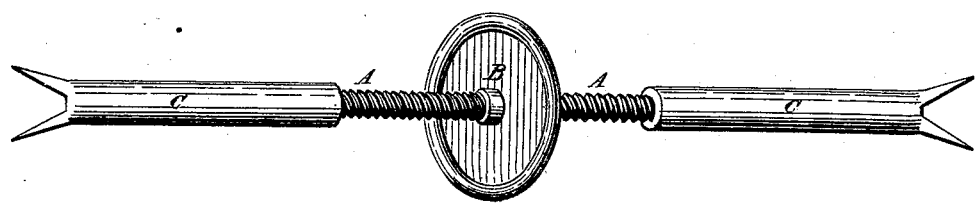
Figure 2:
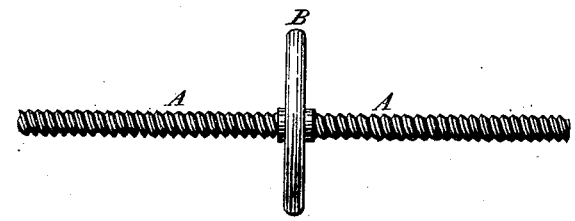
Figure 3:

Figure 1 of the drawing represents a plan view of my invention. Fig. 2 represents the spreading-gage of the machine. Fig. 3 represents the right and left caps of the machine.

My invention relates to cutting up beeves, &c., after slaughter, and is a novel arrangement to simplify the spreading the carcass for dividing and cutting.

A A of the drawing represents the gage of the spreader, and is made of iron or other suitable metallic substance, and consists of screws cut right and left from the center of the gage so as to spread the caps both ways by the same movement of the crank or handle. B is the crank or handle in the center of the gage. It may be made circular, as in the drawing, or in such other mode as the manufacturer may deem best. C C are the caps of the screws of the gage. They may be square or cylindrical outside; must have forks or other equivalent device at the ends; and constructed with female screws inside to correspond, respectively, with the right-and-left-hand screws of the gage A A.

To operate the said invention, put the spreader between the quarters of the carcass, securing the forks firmly. A turn of the crank or handle will contract or spread the gage, as desired.

I claim as my invention—

The spreading apparatus herein described, consisting of the gage A and the forked caps C C, combined and arranged for the purpose stated, substantially as specified.

FOUNTAIN B. GUTHRIE.

Attest:
  THOS. J. WEST,
  JAMES M. THOMPSON.